Figure 3:
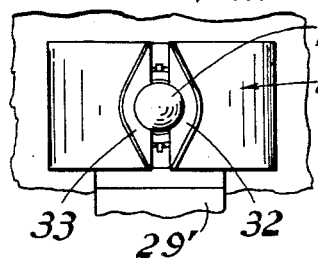

May 10, 1955  G. PAVLINETZ  2,708,266
ELECTRICAL CONNECTORS
Filed March 16, 1950  3 Sheets-Sheet 1

INVENTOR.
George Pavlinetz
BY
Raymond W Cotten
ATTORNEY

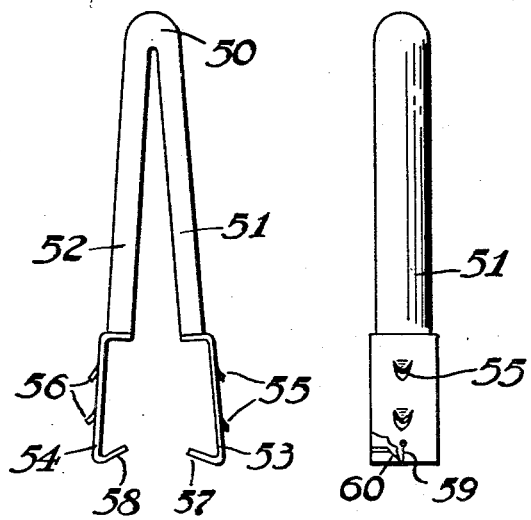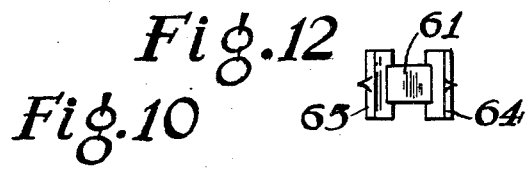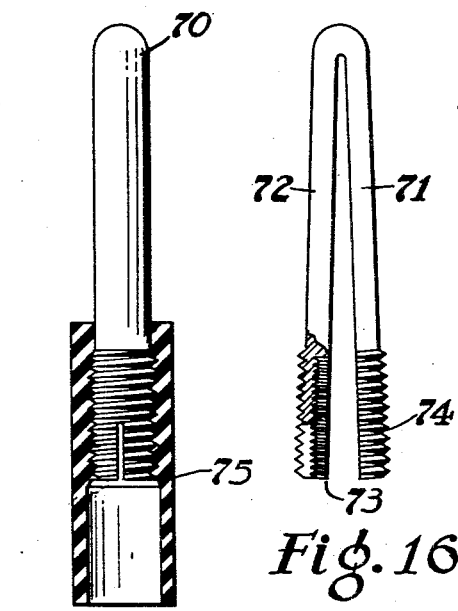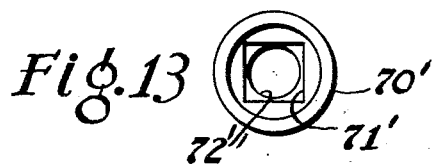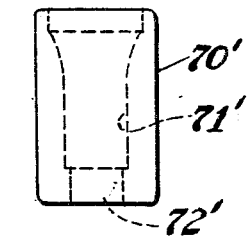

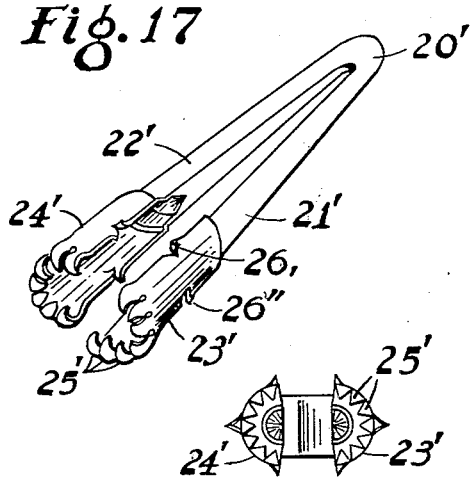
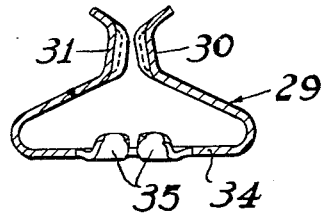
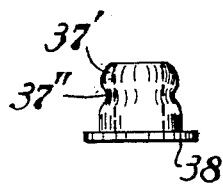
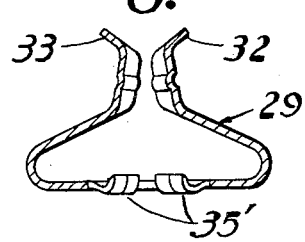
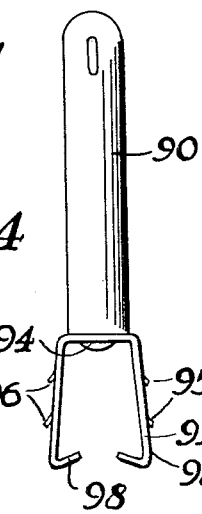
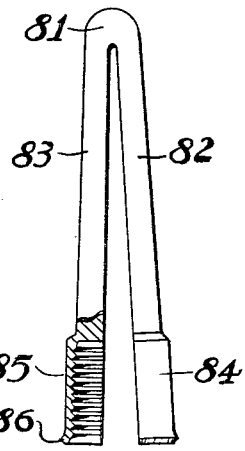
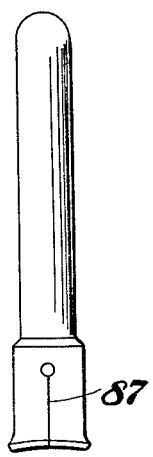
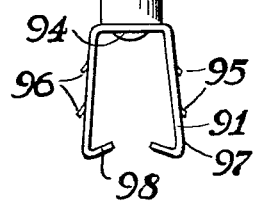
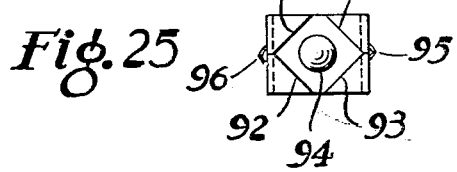

United States Patent Office 2,708,266
Patented May 10, 1955

2,708,266

ELECTRICAL CONNECTORS

George Pavlinetz, Carteret, N. J.

Application March 16, 1950, Serial No. 149,999

5 Claims. (Cl. 339—176)

My invention relates to electrical connectors, more particularly to improved forms of plugs and sockets of a self-locking type, and to such plugs of the solderless type and plugs and sockets requiring a minimum of tools and skill for installation.

The principal object of my invention is to provide a plug and socket which eliminates the necessity for the use of soldering or the use of screws or special tools for installation.

Another object of my invention is to provide an improved type of plug of the solderless type and more particularly to one employing a self-locking clamp type connection to a conductor.

A further object of my invention is to provide a plug or terminal which can be readily attached to the ends of a cable or conductor by an unskilled worker without the use of attaching tools or machinery.

A further object of my invention is to provide a terminal or plug of the self-locking type by which the conductor or cable may be inserted into the plug and anchored in permanently locked position.

A still further object of my invention is to provide a locking means in the form of an electrical insulator and which also protects the terminal and is easy to adjust to locking position.

Another object of my invention is to provide a plug having a locking means which prevents fraying of an insulation which may be used on a cable or conductor.

A still further object of my invention is to provide such a plug or terminal which can be readily formed from sheet or solid bar stock useful for large or small currents.

Another object of my invention is to provide a socket of simple form which may be readily self-locked in position upon a supporting base or panel without the use of expensive tools.

A still further object of my invention is to provide a socket which can be readily formed of sheet stock.

These and other objects will appear hereinafter.

In general, my invention comprises a conductor of U-shape having oppositely disposed elongated portions which are to be received within a socket and having enlarged free ends provided with inwardly directed flexible fingers for engaging a conductor. The enlarged portions are provided with flexible tooth elements. A sleeve is received over the elongated portions and receives within itself the enlarged portions to force the fingers against a conductor received between these portions, and to engage the flexible fingers within the walls of the sleeve to lock the sleeve in position on the enlarged portions of the conductors. The socket for receiving the pin includes a member having oppositely disposed resilient legs biased toward each other and between which the pin is received, and an aperture having collar elements surrounding the aperture for receiving a collar member having a flange. The collar member is received between the collar elements surrounding the aperture and a supporting partition is received between the flange and the base of the socket member. Various modifications are shown and claimed.

Figure 7:
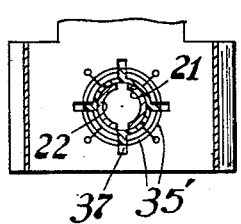
Figure 6:
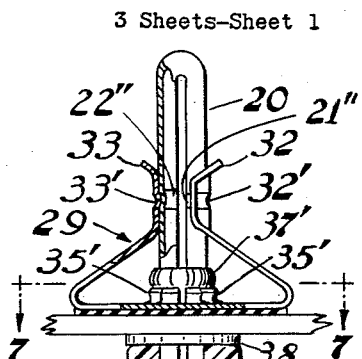
Figure 1:
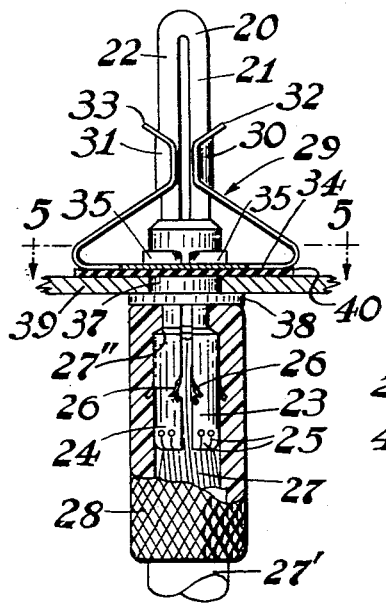
Figure 2:
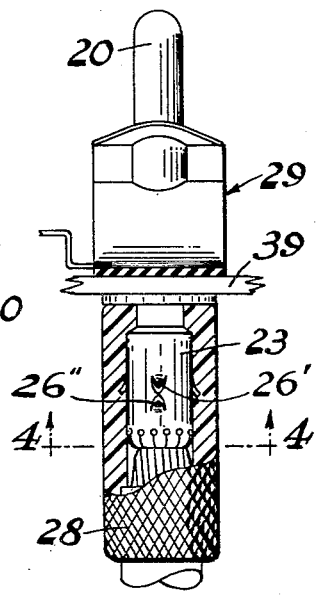
Figure 8:
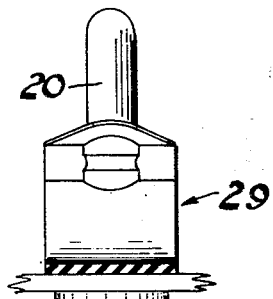
Figure 5:
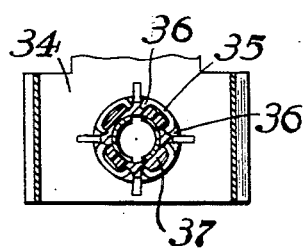
Figure 4:
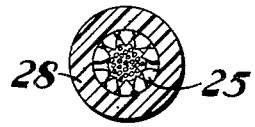

The novel features which I believe to be characteristic of my invention are set forth with particularity in the appended claims, but the invention itself will best be understood by reference to the following description taken in connection with the accompanying drawing in which Figure 1 is a side elevation partly in section showing a plug and socket made according to my invention; Figure 2 is a side view of Figure 1, Figure 3 is a plan view of Figure 1, Figure 4 is a section taken along line 4—4 of Figure 2, Figure 5 is a section taken along line 5—5 of Figure 1, Figure 6 shows a modification of the plug and socket made according to my invention, Figure 7 is a section taken along plane 7—7 of Figure 6, Figure 8 is a side view of Figure 6 partially in section, Figures 9 and 10 are views at 90° to each other showing a modified plug terminal made according to my invention, Figure 11 is a modification of the structure shown in Figure 9, Figure 12 is a top end view of Figure 11, Figure 13 is an end view of an insulating locking sleeve used with the terminal shown in Figures 9 and 10, Figure 14 is a side elevation of Figure 13, Figure 15 is a view partially in section of a modified form of plug made according to my invention, Figure 16 is a side view of the terminal shown in Figure 15, Figure 17 is a perspective of a modification of the pin shown in Figures 1 to 5 inclusive, Figure 18 is an end view of Figure 17, Figure 19 is a partial view of a socket element shown in Figures 1 to 3 inclusive, Figure 20 is a partial section of a socket element shown in Figures 6 to 8 inclusive, Figure 21 is a detail of the collar member used in the modification shown in Figure 6, Figures 22 and 23 show still further modifications of a pin made according to my invention, and Figures 24 and 25 show a still further modification of a connector terminal made in accordance with my invention.

Referring to the drawing, Figures 1 to 5 inclusive, a plug and socket made according to my invetnion includes the plug or terminal comprising the pin or terminal element 20 which may be formed of sheet metal or bar stock and folded to a U-shape to have two oppositely disposed portions 21 and 22 of semi-circular transverse section, which are disposed to form in effect a terminal pin having a circular cross section. The open-ended portion of the terminal pin is provided with enlarged offset portions 23 and 24 of a larger diameter than the part formed by the portions 21 and 22. The lower end of the enlarged portions are slotted to provide inwardly directed flexible pointed finger members 25. Barbed offset portions or teeth 26 and 26' are formed intermediate the ends of the enlarged portions 23 and 24 for purposes to be described.

Prior to the insertion of the insulating and locking sleeve 28, the conductor 27 having the outer insulating coating 27' which is removed from the end of the conductor, is inserted into the enlarged portion of the terminal or pin and the sleeve 28 is then inserted over the nose of the smaller end of the pin and drawn tightly down over the enlarged portion so that the portions 23 and 24 are received within and abut against the shoulder 27" of the sleeve. This forces the two enlarged portions toward each other so that the ends of the pointed fingers 25 firmly engage and bite into the conductor 27, the barbed sharp portions 26 and 26' biting into the inner walls of the sleeve and acting to lock the sleeve over the terminal and conductor. Removal of the sleeve, which may be fairly rigid, is resisted by the ends of the barbed portions digging deeper into the wall of the sleeve when an attempt is made to remove the sleeve. Inwardly directed barb 26" bites into conductor 27. The arrangement of the fingers 25 when the sleeve 28 is in place is shown in Figure 4, which is a transverse section taken along the line 4—4 of Figure 2.

The socket cooperating with my plug and shown generally at 29 may also be formed of sheet metal and includes a base portion 34 having an aperture surrounded by an integral annular or other shaped sleeve having segmentally shaped collar portion 35 provided at the ends thereof with inwardly directed toothed barbed portions 36. The outer ends of the socket are folded back upon themselves as shown and are provided with a pair of semi-circular portions 30 and 31 which are positioned in registry with each other to form in effect a tubular passageway therebetween through which the terminal 20 extends, the oppositely disposed arms being normally biased toward each other as shown in Figures 19 and 20 to place them under tension when the pin 20 is inserted between the portions 30 and 31 to move these portions away from each other. These portions are provided with lip members 32 and 33 to lend rigidity to the arms of the socket.

In order to lock the socket in place an insulating collar or grommet 37 having flange 38 may be inserted through an aperture in the supporting panel 39 into the integral sleeve 35 in the base 34 of the socket. When this collar is forced home the socket is forced against the panel so that the panel and the insulating element 40 are clamped between the flange 38 and the base 34 and the socket is locked in place by the barbed elements or teeth 36 engaging the outside surface of the collar member 37, which is of stiff insulating material. The portions of sleeve 35 are bowed inwardly to create a greater thrust against the grommet. Thus it will be seen that the socket or terminal plug are both insulated from supporting member 39, which may also be, if desired, of stiff conducting material with an integral grommet.

All of the necessary installation and assembly of the above can be done with the minimum of operations and tools.

The modifications shown in Figures 6, 7 and 8 are in essential details much like that shown in Figures 1 and 2. This form of the terminal is preferably first locked in the sleeve 28, then the wire is pushed into same. However the finger portions of the enlarged sections 23 and 24 are modified fingers formed by oppositely disposed slots, one of which 23' is shown, the inner portions being provided with teeth or barbed ends 23" for engaging a conductor, which may be a solid conductor or stiff stranded wire. The insulating collar may be modified to have an annular or other shaped recess 37" as shown in Figure 21 into which the spring fingers 35', formed on the base of the socket 29, extend, the enlarged portion 37' overhanging the ends of these spring fingers. In this form the semi-circular portions 30 and 31 of the oppositely disposed arms of the socket may be provided with inwardly directed annular depressions 32' and 33'. In other respects this modification is similar to that shown in Figures 1 and 2. These semi-annular depressions 33' and 32' act as a slip preventing slide latch, said depressions acting with semi-annular depressions 22" and 21". This form is particularly favorable where the socket has to be mounted on an overhead panel.

The form of the pin may be modified as shown in Figures 9 and 10. Here the oppositely disposed portions 51 and 52 may be folded at 50 and provided at their free ends with rectangularly shaped portions 53 and 54 having the inwardly directed clamping teeth or jaws 57 and 58 having V-shaped slots, for example 60, to receive the conductor, and the enlarged portions having slots or slits such as 59 to lend resiliency to the two halves of each arm portion for receiving the conductor to be clamped thereby. The teeth or barbed elements 55 and 56 serve the same purpose as the figures previously described, to engage the walls of a conducting sleeve, such as shown in Figures 13 and 14, the sleeve 70' being received over the pin, the pin portion 50 extending through aperture 72' and the rectangularly shaped portions engaging the walls of the rectangularly shaped passageway 71'. The pin portion or terminal may be flat as shown in Figure 11 where the two arm portions 62 and 63 are oppositely disposed when the punched and formed pin is folded at 61, the free ends of the pins being provided again with rectangularly shaped portions 64 and 65 having the barbed teeth as before.

If desired the pin may be made from solid stock as shown in Figures 15 and 16, the inner and outer surfaces being provided with screw portions 73 and 74, the pin being slotted to provide oppositely disposed resilient legs which can be forced toward each other by an insulating sleeve 75 having a threaded portion for engaging the free ends of the legs and forcing ends of the legs toward the conductor to engage the same in a clamping action. It is obvious that many variations of the pin are possible.

As will be seen in Figure 17, the terminal pin 20' may be of a solid stock having oppositely disposed leg portions 21' and 22'. The lower portions are enlarged as at 23' and 24' and are provided with inwardly directed flexible fingers 25' for engaging a conductor as shown in Figure 1. Barbed portions 26' and 26" engage a sleeve when received over the leg members 21' and 22' and when the enlarged portions 23' and 24' are received within the sleeve.

In Figures 19 and 20 are shown the socket members 29 without the pin received therebetween. It will be seen that the pin receiving portions 30 and 31 are tilted toward each other and are preformed so that when a pin is received between the legs 30 and 31 these portions will be spread apart and placed under tension.

In the modification shown in Figures 22 and 23 the pin 81 may again be made of solid stock and slotted to provide the oppositely disposed elongated leg members 82 and 83 terminating in the enlarged portions 84 and 85, which may be internally threaded for receiving the end of the conductor and provided with an outwardly extending lip 86. The opposite portions 84 and 85 may be slotted, for example, at 87 to provide for resiliency of the enlarged portions when a sleeve is fitted thereover for forcing the screw portions into the surface of a conductor received within the threaded portion.

In Figures 24 and 25 I show a still further modification of a connector terminal made according to my invention. It comprises solid portion 90, which may be unslotted, secured to a U-shaped member 91 by means of a rivet 94 extending through the U-shaped member and engaging the solid pin 90. This rivet 94 may be made integral with the pin and peaned over if desired. The wire gripping member 91 is provided with oppositely disposed legs 97 and 98 having at their free ends inwardly directed upwardly slanted tooth members 92 and 93 which may be provided with a V-shaped slot therebetween. Barbed members 95 and 96 may be integrally formed on the U-shaped member 91 and an insulating sleeve is used with this arrangement as with the other forms previously described.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A connector having oppositely disposed elongated portions to be received within a socket, said portions being enlarged at one end, said enlarged ends terminating in fingers inwardly directed toward each other for engaging a conductor, flexible tooth elements adjacent said enlarged ends extending outwardly therefrom and oppositely to said fingers, and a sleeve receiving said elongated portions and engaging said enlarged ends for forcing said enlarged ends toward each other whereby said inwardly directed fingers will clamp between them a conductor received therebetween, said tooth elements engaging the inside surface of said sleeve to lock said sleeve on said conductor.

2. A connector of elongated U-shape having oppositely disposed elongated sections to be received within a socket, said sections having enlarged portions at the free ends thereof, said enlarged portions terminating in inwardly directed fingers at their ends and extending toward each other for engaging a conductor, flexible tooth elements on said enlarged portions extending outwardly therefrom and oppositely to said fingers, a sleeve, said elongated sections being received within and extending from one end of said sleeve, said sleeve engaging said enlarged portions for forcing said enlarged portions toward each other whereby said inwardly directed fingers will clamp between them a conductor received therebetween, said tooth elements engaging the inside surface of said sleeve to lock said sleeve on said connector.

3. A connector having oppositely disposed elongated portions to be received within a socket, said portion being joined at one end and having enlarged rectangular shaped portions at their other end, said enlarged portions being provided at their ends with inwardly directed fingers for engaging a conductor, flexible sharpened tooth elements on said enlarged portions extending outwardly therefrom, and a sleeve receiving said elongated portions and tightly engaging said elongated portions for forcing said enlarged portions toward each other whereby said inwardly directed fingers will clamp between them a conductor received therebetween, said sharpened tooth elements engaging the inside surface of said sleeve to lock said sleeve on said connector.

4. A connector of U-shape and having oppositely disposed elongated sections of semi-circular cross section to be received within a socket, said sections being joined at one end and having at their free ends enlarged semi-circular portions, said enlarged portions being provided at their free ends with inwardly directed fingers for engaging a conductor, flexible tooth elements intermediate the ends of said enlarged portions and extending outwardly therefrom, a sleeve, said sleeve having sections of different internal diameter, said elongated sections received within and extending from one end of said sleeve, said sleeve engaging said elongated portions and said enlarged portions for forcing said enlarged portions toward each other whereby said inwardly directed fingers will clamp between them a conductor received therebetween, said tooth elements engaging the inside surface of said sleeve to lock said sleeve on said connector, said elongated sections having therearound annular depressions for cooperating with a socket having annular protrusions cooperating therewith.

5. A connector comprising a pin element of elongated U-shaped structure with closely spaced oppositely disposed legs, the free ends of said legs being provided with enlarged portions, the free ends of said enlarged portions terminating in flexible fingers provided with ends inwardly directed toward each other for engaging a conductor received between the legs of said U-shaped member, said enlarged portions having outwardly directed teeth thereon oppositely from said fingers, and a sleeve provided with a passageway therethrough received over said legs for tightly engaging said legs including said enlarged portions, whereby said enlarged portions are forced toward each other to engage in a clamping manner a conductor received between the ends of said flexible fingers, the teeth on said enlarged portions engaging the inner surface of said sleeve to lock said sleeve in position.

References Cited in the file of this patent

UNITED STATES PATENTS

| 593,467 | Gottschalk | Nov. 9, 1897 |
| 757,192 | Houghton | Apr. 12, 1904 |
| 1,906,469 | Knutson | May 2, 1933 |
| 2,112,680 | Sambleson | Mar. 29, 1938 |
| 2,291,434 | Hollopeter et al. | July 28, 1942 |
| 2,309,311 | Grohagal | Jan. 26, 1943 |
| 2,432,966 | Del Camp | Dec. 16, 1947 |
| 2,517,677 | Kjell-Berger et al. | Aug. 8, 1950 |

FOREIGN PATENTS

| 488,798 | Germany | Jan. 8, 1930 |
| 589,656 | Great Britain | June 26, 1947 |